Figure 1:
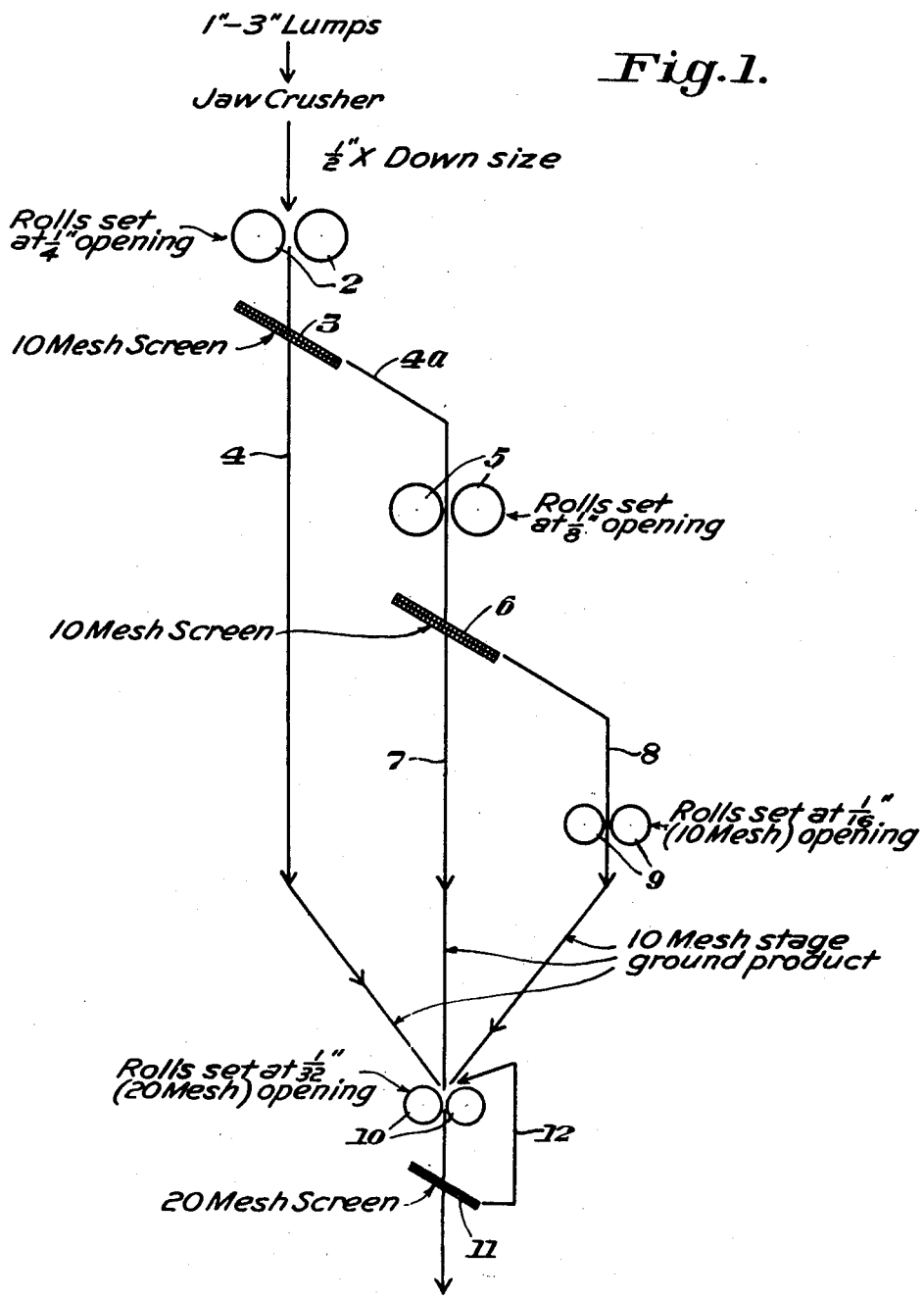

May 15, 1951 — H. E. DUNN ET AL — 2,553,444
PREPARATION OF PURE METALLIC CARBIDES
Filed July 19, 1947 — 3 Sheets-Sheet 3

TREATMENT OF TITANIUM CARBIDE CONTAINING OVER ABOUT 8% GRAPHITE

INVENTORS
Holbert Earl Dunn and
William T. Bradley

Patented May 15, 1951

2,553,444

UNITED STATES PATENT OFFICE 2,553,444

PREPARATION OF PURE METALLIC CARBIDES

Holbert E. Dunn, Crafton, and William T. Bradley, Carnegie, Pa., assignors to Vanadium Corporation of America, New York, N. Y., a corporation of Delaware Application July 19, 1947, Serial No. 762,074

11 Claims. (Cl. 241—20)

This invention relates to a process of purifying metallic carbides containing graphitic carbon, whereby metallic carbides which are substantially free from graphitic carbon and other impurities can be produced.

The metallic carbides, for example, vanadium carbide, titanium carbide, tungsten carbide, zirconium carbide, columbian carbide, tantalum carbide, chromium carbide and molybdenum carbide and some of the carbides of non-metallic elements, as for example, boron carbide, are prepared by fusing an oxide of metallic element and carbon in such proportions that the solidified regulus contains graphitic carbon in addition to its combined carbon. It also contains nitrogen and other impurities. The number and size of the graphite particles are dependent upon conditions existing at the time of their formation. They are usually finely dispersed therein and intimately mixed with the carbide base which prevents an easy separation. On the other hand, some of the more stable oxides often are not completely reduced by ordinary pyrometallurgical methods, even in the presence of a large excess of carbon. Such unreduced oxides may appear as impurities in the carbide. Quantitatively, however, free carbon is usually the major impurity in carbides prepared by such pyrometallurgical methods.

Graphitic carbon and other impurities are undesirable in the application of metal carbides, as for example, where the metal carbides are to be used in the production of sintered carbide cutting tools, dies and wear resisting parts. Attempts have been made to avoid the presence of graphitic carbon by decreasing the amount of carbon mixed with the metallic oxide in the melting operation but this causes large losses in the metal content.

Laughlin Patent 2,310,964 describes a method of purifying metallic carbides which involves attrition grinding the metallic carbide in a ball mill to 325 mesh particle size, agitating the attrition ground carbide with a soap solution, allowing the carbide to settle and pouring off the supernatant liquor. Such method has met with no significant success for it removes only a part of the graphitic carbon and causes appreciable losses of the metallic carbide. The difficulty of separating graphitic carbon from metallic carbides by such settling and decanting methods arises from the fact that particles of titanium carbide of 44 microns diameter (325 mesh) will settle through water at a rate of only 0.256 centimeters per second faster than graphite particles of the same size. The patentee also came to the conclusion that froth flotation methods are completely ineffectual in removing graphitic carbon from titanium carbide.

Contrary to the conclusions reached in the above referred to patent, we have found that substantially all graphitic carbon may be removed from metallic carbides without appreciable loss of the carbide itself and that other undesirable impurities are substantially eliminated. As previously stated, the particles of graphitic carbon are dispersed throughout the metallic carbide and in order to release them from the metallic carbide, it is necessary to reduce the particle size of the carbide to approximately the size of the graphitic carbon. Usually this means that the metallic carbide must be reduced to a particle size of —325 mesh although in some cases grinding to a particle size of —150 mesh will release substantially all of the graphite. Considering the case where it is necesary to grind to —325 mesh in order to release the graphitic carbon, if the usual attrition grinding procedure such, for example, as grinding in a ball mill is resorted to, it will be found that the graphite particles cannot be separated satisfactorily from the metallic carbide particles by a froth flotation step. The attrition grinding of the metallic carbide in a ball mill results in a large proportion of ultra-fine particles of both graphitic carbon and metallic carbide. Although metallic carbides have a higher specific weight than graphitic carbon, when the two are ground to very fine particle size, they both tend to respond to froth flotation treatment in a similar manner so that they both tend to go into the froth rather than allowing the graphitic carbon particles to go off in the froth and the metallic carbide particles to be recovered as a sink product. Attrition grinding also causes the ultra-fine graphitic carbon particles to become smeared on the particles of metallic carbide and to cause them to be carried off in the froth.

In accordance with our invention the size reduction of the regulus containing metallic carbide and graphitic carbon is carried out in such manner as to produce a minimum of fines and a minimum of coating of the metallic particles by graphitic carbon. In other words the comminution of the regulus is carried out in such manner as to keep the size of the individual particles passing through a screen of given size as near as possible to the maximum size which will pass through that screen. Overgrinding of the metallic carbide and graphite is detrimental to the separation of these materials by the flotation step and in our process is avoided. Thus if it is necessary to reduce the size of the regulus to —325 mesh in order to release substantially all of the graphitic carbon from the metallic carbide so that the two may be separated by froth flotation, the method employed in reducing the regulus to —325 mesh is such as to produce a minimum of particles which are considerably finer than 325 mesh. Our process involves two different types of comminution processes in preparing the regulus for froth flotation. The first type of comminution step is a crushing operation which is characterized by a maximum of impact breaking and a minimum of attrition grinding. One example of such crushing method is stage roll crushing as shown in Figure 1 and described more particularly hereinafter. Another method of crushing which results in a minimum of fines is crushing in an air swept ball mill in which the air sweeps away the fines rather than to allow them to be continually ground finer. Another type of crushing which produces a minimum of fines is the employment of an air swept ringroll crusher in which the air likewise sweeps away the fines rather than allowing them to be ground finer. In carrying out our method, the stage roll crushing or its equivalent is carried out until the regulus has been reduced to a particle size necessary to release a substantial portion of the graphitic carbon from the metallic carbide. This step is usually carried out until the particle size has been reduced to between 10 and 65 mesh, say for example, 20 mesh. By this procedure a considerable portion of the comminution necessary to reduce the particle size to —325 mesh has been accomplished by means which produces a minimum of fines. After the regulus has been reduced to 10 to 65 mesh by the stage roll crushing or its equivalent, it is subjected to attrition grinding to —325 mesh particle size or to other particle size necessary to release substantially all of the graphitic carbon from the metallic carbide. In view of the fact that a considerable portion of the comminuation of the regulus has been carried out in such manner as to avoid the formation of fines, the product of —325 mesh particle size contains a much smaller proportion of ultra fines than would be the case if the whole comminution had been carried out by attrition grinding in a ball mill. The smaller proportion of ultra fines enables good separation of the graphitic carbon from the metallic carbide by froth flotation.

Figure 2:
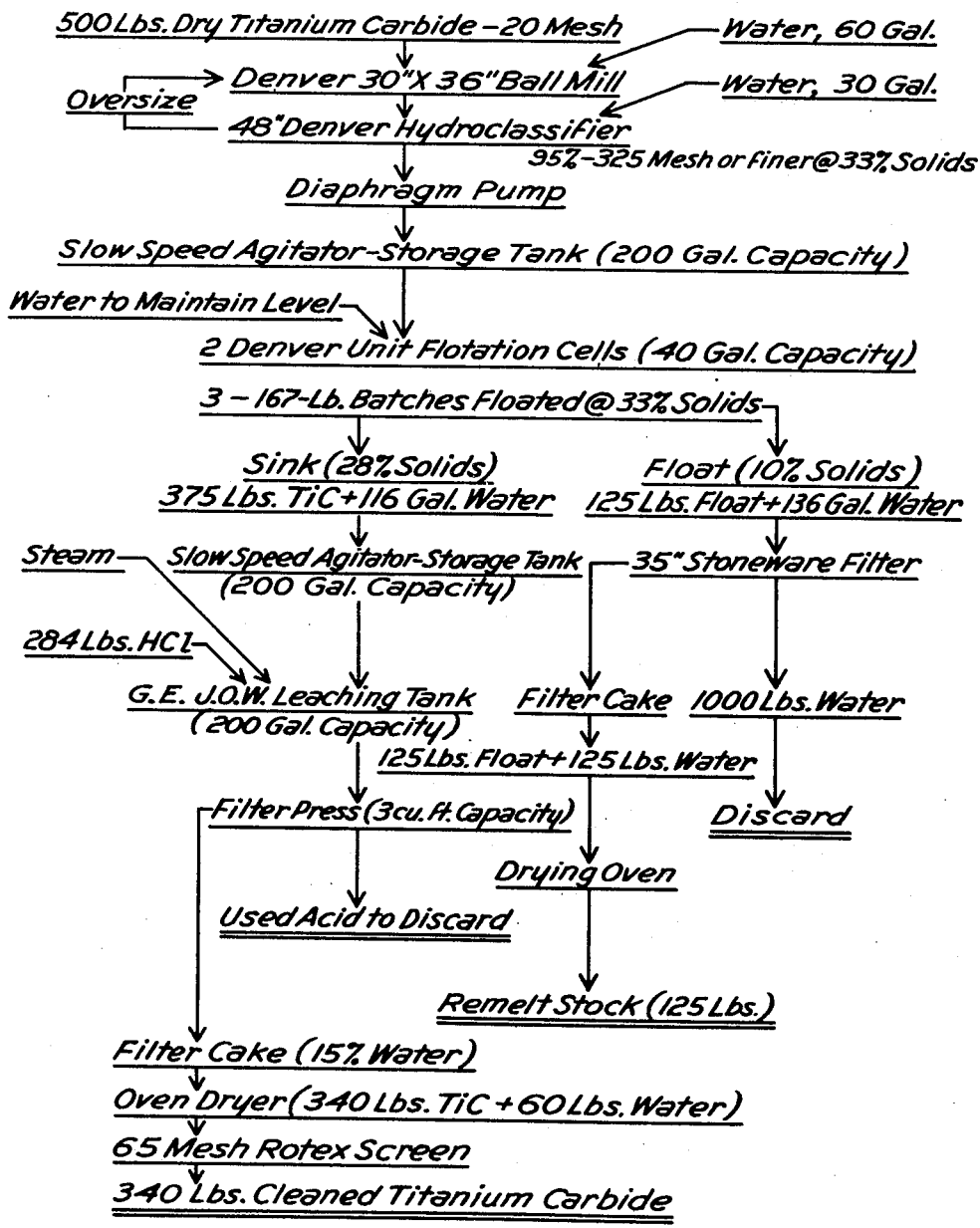
Figure 3:
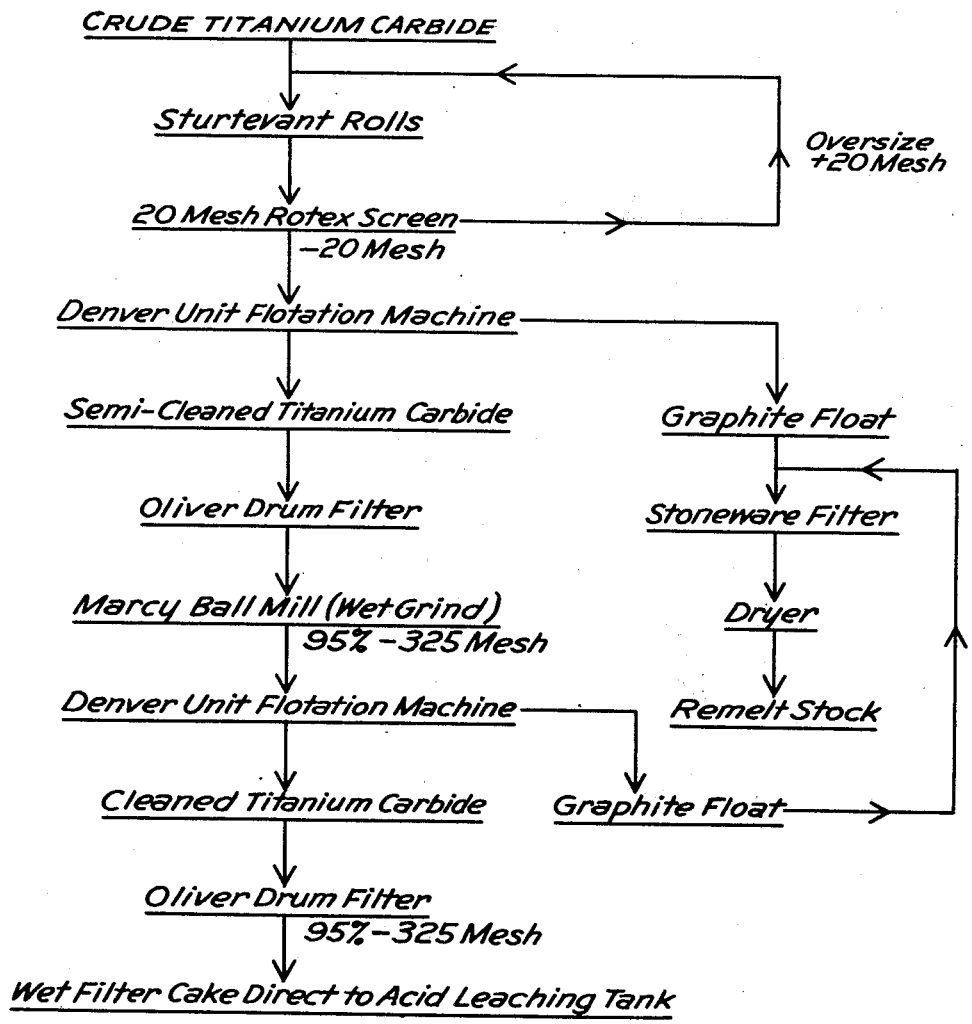

In the accompanying drawings which illustrate certain preferred embodiments of our invention, Figure 1 is a diagrammatic illustration of a preferred method of stage roll crushing to produce a product of 20 mesh by down size containing a minimum of fines;

Figure 2 is a flow sheet illustrating a preferred method of treating titanium carbide containing not over about 8% of graphite; and Figure 3 is a flow sheet illustrating a preferred method of treating titanium carbide containing over about 8% of graphite.

In view of the difficulties presented in the removal of contaminating impurities introduced in the pyrometallurgical process of smelting metallic carbides, all possible care should be exercised in the selection of raw materials, including natural or prepared oxides of the metal involved and the carbon reducing agent. We prefer to employ oxide of the metallic element and carbon in such proportions that the solidified regulus resulting from the smelting operation contains more than about 8% graphitic carbon. A great advantage of employing such metallic carbide lies in the fact that as the graphitic carbon content is increased above about 8%, the nitrogen content drops sharply to a very low value and the ratio of metal to combined carbon in the purified carbide approaches more nearly the stoichiometric proportions for pure metallic carbide.

In carrying out our process, lumps of the crude carbide or regulus are crushed in a manner characterized by a maximum of impact breaking and a minimum of attrition grinding to a particle size necessary to release a substantial portion of the graphitic carbon from the metallic carbide. This usually involves crushing to a particle size between about 10 and 65 mesh and may be carried out in the manner illustrated in Figure 1, which method results in crushed carbide of 20 mesh by down size containing a minimum of fines, the method being commonly known as "stage roll crushing." Referring to that figure, lumps of metallic carbide of 1 to 3 inch size or larger are crushed in a jaw crusher 1 to produce particles ½ inch by down size. These particles are fed between crushing rolls 2 set at ¼ inch opening. The material which passes the rolls 2 is screened on a 10 mesh screen 3. The 10 mesh or finer material 4 passing through the screen is collected and the over size material 4a is passed through a set of rolls 5 set at ⅛ inch opening. The material coming from rolls 5 is screened through a 10 mesh screen 6 and the material 7 passing through the screen is collected. The over size material 8 is passed through rolls 9 set at $\frac{1}{16}$ inch (10 mesh) opening. The material passing through the rolls 9 is added to the 10 mesh material which has passed through the screens 3 and 6. The 10 mesh material is passed through rolls 10 set at $\frac{1}{32}$ inch opening (20 mesh) and then screened through a 20 mesh screen 11, the over size material 12 being returned to the rolls 10. In this manner a 20 mesh by down material is produced which contains a minimum of fines.

In carrying out this process it is preferred that the size reduction per pass be limited to a ratio of about 2:1. This ratio is maintained in the process of Figure 1 as will be seen from the fact that the successive rolls are set at ¼ inch opening, ⅛ inch opening, $\frac{1}{16}$ inch opening and $\frac{1}{32}$ inch opening. If the reduction per pass is greater than about 2:1, the tendency to produce objectionable amounts of fines is increased.

After the crude carbide has been reduced to 10 to 65 mesh with the production of a minimum of fines, the subsequent steps of the process will depend on the amount of graphitic carbon in the crude carbide, and the degree of purification required. If the crude carbide contains less than about 8% of graphite, it is preferred to carry out the process as illustrated in Figure 2. If it contains over about 8% of graphite, it is preferred to employ an additional flotation step as illustrated in Figure 3. Referring to Figure 2, titanium carbide or other metallic carbide which has been crushed to —20 mesh size by the method illustrated in Figure 1 is subjected to attrition grinding with water in a ball mill for a length of time such that 95% is finer than 325 mesh. The aqueous pulp of this finely ground carbide at a pulp density of 33% solids is subjected to froth flotation. The froth flotation may be carried out with the liquid basic, acidic or neutral, but best results are obtained if the hydrogen ion concentration is adjusted to pH 7.0 or less. If basic materials, such as lime or soda, were used in producing the carbide, the pulp may have a pH higher than 7.0. Hydrochloric acid or other acids may be used to neutralize the pulp and make it acid.

The froth flotation is carried out by agitating the pulp in the presence of a suitable reagent or reagents. While a combination of reagents may be used to promote frothing, conditioning and collecting, we have found that certain single reagents such as pine oil, pine tar oil and cresylic acid, promote satisfactory separations when used alone. We prefer to use a single reagent for reasons of overall economy and simplicity of operation. Our invention is not limited to the use of the particular reagents mentioned but on the contrary, other reagents alone or in combination, and either natural or syntehtic, may be employed, such as those sold under the trade names "Aerosol," "Tarol" and "Pentasol." One of the most efficient of the reagents is, however, pine oil. the pulp in the presence of a suitable reagent or usually mechanically agitated and air under pressure is admitted. As the froth develops above the pulp, it is continuously removed until that which remains becomes white and devoid of free carbon. The frothing reagents are replaced by adding them as needed. Their consumption does not usually exceed 0.50 pound per ton of carbide treated, and often is as low as 0.10 pound per ton.

The floated material is predominately graphite containing some fine metallic carbide, but this metallic carbide is usually only a very small fraction of the total treated, while the product remaining in the flotation machine is the metallic carbide substantially free of graphite.

Hydrochloric acid is then added to the pulp of metallic carbides to dissolve impurities such as silicon, iron and other metals. The solution is filtered and the filtrate is discarded. The filter cake is dried and screened to break up agglomerates, which results in titanium carbide of 325 mesh by down size which is substantially free from graphite and other impurities.

Figure 3 illustrates a method of purifying metallic carbide containing above about 8% graphite. According to this method, crude titanium carbide is crushed to 20 mesh by down size according to the method illustrated in Figure 1 or by another equivalent method which produces a minimum of fines. The 20 mesh by down crude carbide is subjected to a froth flotation step which removes a part of the graphite in the froth. The semi-cleaned metallic carbide is filtered and then attrition ground in a ball mill for a time sufficient that 95% passes through a 325 mesh screen. The pulp is subjected to froth flotation which removes substantially all of the graphite and the pulp of cleaned metallic carbide is treated with acid as described in connection with Figure 2 in order to remove silicon, iron and other metals. Thereafter the treatment is in accordance with the process shown in Figure 2. The graphite floats from the first and second flotation steps are combined and filtered and dried. The product may be used as remelt stock in making a further quantity of titanium carbide.

The following are examples illustrating our process:

*Example 1*

Crude titanium carbide containing 1.29% graphite was crushed to −20 mesh by stage roll crushing as illustrated in Figure 1 and the −20 mesh carbide was ground dry in a ball mill to 96% −325 mesh. Two thousand grams of the carbide was added to approximately seven thousand ccs. of water in a Denver Sub-A flotation machine (2000-gram size). This titanium carbide aqueous pulp was agitated for 15 minutes, then 10 drops of pine oil was added and the agitation continued for 5 more minutes. Air was then admitted and the froth which immediately began to form was removed by continual scraping until the bubbles became small, white and free of graphite attachments. The air and agitation were then stopped, the flotation machine drained, and the contents filtered. The resulting filter cake was dried and analyzed. This treatment reduced the graphite to 0.31% while the recovery of titanium carbide was 97% of that in the feed.

*Example 2*

Crude vanadium carbide containing 4.54% graphite was crushed to −20 mesh by the stage roll crushing method illustrated in Figure 1 and the −20 mesh carbide was attrition ground in a ball mill to 95% −200 mesh. Two thousand grams of the ground carbide was added to 7 liters of water in a Denver Sub-A 2000-gram size, flotation machine. The vanadium carbide aqueous pulp was agitated for 15 minutes. Twelve drops of pine oil was added and the agitation continued for 10 minutes. The air was then admitted and the froth removed until the bubbles formed were free of graphite, after which the agitation was stopped and the flotation machine emptied. The contents were filtered, and the filter cake was dried and analyzed. The cleaned vanadium carbide now contained only 0.46% graphite while the vanadium carbide recovery was 87.81% of that in the feed.

*Example 3*

Crude zirconium carbide was crushed to −20 mesh by the stage roll crushing procedure illustrated in Figure 1 and then ground dry in a ball mill to 97.5% −325 mesh. One thousand grams of the ground zirconium carbide analyzing 82.05% zirconium and 3.13% graphite was added to a 1000-gram, Fagergren flotation machine with 2900 cc. of water and agitated for 10 minutes. Five drops of "Tarol" was then added and the froth continued to be removed until it was free of graphite, then the machine was drained and the contents filtered, dried and sampled. This cleaned zirconium carbide contained only 0.26% graphite and 85.12% zirconium, which represented a zirconium recovery of 95.55% of that contained in the flotation feed.

*Example 4*

Crude titanium carbide was crushed to −20 mesh by the stage roll crushing procedure shown in Figure 1 and the −20 mesh carbide was wet ground in a ball mill at 50% solids pulp density to 98% −325 mesh. One hundred and sixty pounds of the ground titanium carbide containing 5.19% graphitic carbon was added to a Denver unit cell of 9 cubic feet capacity, the machine filled to the desired height with water and the pulp at 32.5% solids was agitated 10 minutes. Two and one-half cubic centimeters of pine oil was added, a few drops at a time, and air was admitted to form a froth. The froth was continually removed by the automatic front paddle on the flotation machine. After approximately an hour had elapsed, the froth became free of graphite and the flotation was stopped. The cleaned titanium carbide after filtering and drying contained 0.11% graphitic carbon and 75.00% titanium which represented 81.2% of the titanium contained in the feed.

Example 5

This example illustrated the process as applied to the purification of metallic carbides containing a relatively large percentage of graphitic carbon, the process employing two flotation steps. Titanium carbide containing 11.73% graphitic carbon was crushed to −20 mesh by the stage roll crushing procedure illustrated in Figure 1 and 150 pounds of the −20 mesh titanium carbide was added to a Denver unit cell of 9 cubic feet capacity. The machine was filled with water to the operating height and the pulp at 31.1% solids was agitated for 10 minutes. To this pulp was added 1500 cc. of concentrated hydrochloric acid to lower the hydrogen ion concentration to 7.0. Two cubic centimeters of pine oil was added, a few drops at a time, air was admitted, and the froth continually removed by the automatic froth paddle on the flotation machine. After approximately an hour had elapsed, the froth became free of graphite and flotation was stopped. The pulp was drained from the machine and filtered. A sample was then removed for analysis which showed 7.82% graphite.

The −20 mesh semi-cleaned titanium carbide was then added to a ball mill with sufficient water to make a 50% solids pulp density and ground to 96% −325 mesh, then drained from the ball mill and added to the same flotation machine and refloated at 27.8% solids using 2.5 cc. of pine oil as frothing agent and 1250 cc. of concentrated hydrochloric acid for pH control. The froth was removed until it was clean, then the pulp was drained from the machine and filtered. The filter cake was dried and sampled. The cleaned titanium carbide now analyzed only 0.22% graphite and the titanium carbide recovery was 76.98% of that in the feed.

In carrying out the froth flotation step to remove graphitic carbon in the froth, pulp compositions ranging from 10 to 50% solids can be employed. In carrying out this separation in the smaller size flotation cells, such for example as batch type laboratory machines, pulps containing 10 to 25% solids may be used, the preferred working range for these smaller units being 20 to 25% solids. For the large size cells, such as those used in commercial practice, pulps containing 30 to 35% solids are preferred. Thus while the full utilizable range is 10 to 50% solids, best results are secured between the limits of 20 to 35%, with 30 to 35% most desirable, depending somewhat upon the type of equipment used.

It will be seen from the description of the process hereinbefore given that the combination of stage roll crushing to produce particles of 10 to 65 mesh while producing a minimum of fines when combined with the attrition grinding step to reduce the particle size to −325 mesh results in a finely ground crude carbide from which the graphite may be floated off in the froth whereby a good separation of graphitic carbon and metallic carbide may be obtained. Ordinary methods of grinding such as ball mill grinding to −325 mesh, do not result in a product from which the graphitic carbon may be reliably floated off in a froth flotation step with acceptable commercial efficiency. Accordingly, we have devised a comminution procedure which renders feasible the separation of graphite from metallic carbides by a simple froth flotation.

The invention is not limited to the preferred embodiments or examples, but may be otherwise embodied or practiced within the scope of the following claims.

We claim:

1. The method of purifying a metallic carbide regulus containing combined carbon and graphitic carbon, which comprises crushing the regulus to a maximum particle size in the range of 10 to 65 mesh by a series of breaking operations each of which is followed by a removal of particles of less than the maximum size to release a substantial portion of the graphitic carbon from the metallic carbide, attrition grinding to a maximum particle size of 150 mesh to release substantially all of the graphitic carbon from the metallic carbide, forming an aqueous pulp of the ground carbide including a frothing agent, agitating the pulp to form a froth, separating the froth containing graphitic carbon from the liquid pulp while continuing agitation of the pulp, and recovering metallic carbide from the pulp.

2. The method of purifying a metallic carbide regulus containing combined carbon and graphitic carbon, which comprises crushing the regulus to a maximum particle size in the range of 10 to 65 mesh by a series of breaking operations each of which is followed by a removal of particles of less than the maximum size to release a substantial portion of the graphitic carbon from the metallic carbide, attrition grinding to a maximum particle size of 325 mesh to release substantially all of the graphitic carbon from the metallic carbide, forming an aqueous pulp of the ground carbide including a frothing agent, agitating the pulp to form a froth, separating the froth containing graphitic carbon from the liquid pulp while continuing agitation of the pulp, and recovering metallic carbide from the pulp.

3. The method according to claim 2, wherein the attrition grinding to a maximum particle size of 325 mesh is carried out by a ball milling operation.

4. The method according to claim 2, wherein the crushing of the regulus to a maximum particle size in the range of 10 to 65 mesh is carried out by a stage-roll crushing operation.

5. The method according to claim 2, wherein the crushing of the regulus to a maximum particle size in the range of 10 to 65 mesh is carried out by an air-swept ball milling operation.

6. The method according to claim 2, wherein the crushing of the regulus to a maximum particle size in the range of 10 to 65 mesh is carried out by an air-swept ring-roll crushing operation.

7. The method according to claim 2, wherein the crushing of the regulus to a maximum particle size in the range of 10 to 65 mesh is carried out by a stage-roll crushing operation and wherein the attrition grinding to a maximum particle size of 325 mesh is carried out by a ball milling operation.

8. The method according to claim 2, wherein the aqueous pulp of ground carbides has a solids concentration of about 10 to 50%.

9. The method according to claim 2, wherein the pulp is leached with acid after froth flotation and before recovering metallic carbide from the pulp.

10. The method of purifying a metallic carbide regulus containing combined carbon and graphitic carbon, which comprises crushing the regulus to a maximum particle size in the range of 10 to 65 mesh by a series of breaking operations each of which is followed by a removal of particles of less than the maximum size to release a substantial portion of the graphitic carbon from the metallic carbide, forming an aqueous pulp of the ground carbide including a frothing agent, agitating the pulp to form a froth, separating the froth containing graphitic carbon from the liquid pulp while continuing agitation of the pulp, subjecting the non-floating residue to attrition grinding to a maximum particle size of 150 mesh to release a further quantity of graphitic carbon from the metallic carbide, forming an aqueous pulp of the ground carbide including a frothing agent, agitating the pulp to form a froth, separating the froth containing graphitic carbon from the liquid pulp while continuing agitation of the pulp, and recovering metallic carbide from the pulp.

11. The method of purifying a metallic carbide regulus containing combined carbon and graphitic carbon, which comprises crushing the regulus to a maximum particle size in the range of 10 to 65 mesh by a series of breaking operations each of which is followed by a removal of particles of less than the maximum size to release a substantial portion of the graphitic carbon from the metallic carbide, forming an aqueous pulp of the ground carbide including a frothing agent, agitating the pulp to form a froth, separating the froth containing graphitic carbon from the liquid pulp while continuing agitation of the pulp, subjecting the non-floating residue to attrition grinding to a maximum particle size of 325 mesh to release substantially all of the graphitic carbon from the metallic carbide, forming an aqueous pulp of the ground carbide, including a frothing agent, agitating the pulp to form a froth, separating the froth containing graphitic carbon from the liquid pulp while continuing agitation of the pulp, acid leaching and recovering metallic carbide from the pulp.

HOLBERT E. DUNN.
WILLIAM T. BRADLEY.

REFERENCES CITED

The following references are of record in the file of this patent:

UNITED STATES PATENTS

| Number | Name | Date |
|---|---|---|
| 2,161,011 | Breerwood | June 6, 1939 |
| 2,183,500 | Crawford | Dec. 12, 1939 |

OTHER REFERENCES

Taggart—Handbook of Mineral Dressing, 1945, section 4, pages 93 to 98, section 12, page 95.